United States Patent
Toyoshima (10) Patent No.: US 8,027,325 B2
(45) Date of Patent: Sep. 27, 2011

(54) HOME NETWORK USING WIRELESS MODULE

(75) Inventor: Akihiko Toyoshima, Kanagawa (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 12/914,292

(22) Filed: Oct. 28, 2010

(65) Prior Publication Data
US 2011/0040873 A1 Feb. 17, 2011

Related U.S. Application Data

(63) Continuation of application No. 12/609,595, filed on Oct. 30, 2009, now Pat. No. 7,894,414, which is a continuation of application No. 11/545,388, filed on Oct. 10, 2006, now Pat. No. 7,693,121, which is a continuation of application No. 09/976,455, filed on Oct. 11, 2001, now Pat. No. 7,230,939.

(60) Provisional application No. 60/240,011, filed on Oct. 13, 2000.

(51) Int. Cl.
H04W 4/00 (2009.01)
(52) U.S. Cl. .................... 370/338; 370/401; 370/419
(58) Field of Classification Search .................. None
See application file for complete search history.

(56) References Cited

U.S. PATENT DOCUMENTS

| | | | | |
|---|---|---|---|---|
| 5,559,501 A | * | 9/1996 | Barzegar et al. | 361/728 |
| 6,389,337 B1 | * | 5/2002 | Kolls | 701/29 |
| 6,717,801 B1 | * | 4/2004 | Castell et al. | 361/679.41 |
| 2003/0069996 A1 | * | 4/2003 | Parrott | 709/250 |

* cited by examiner

Primary Examiner — Bob Phunkulh
(74) Attorney, Agent, or Firm — John L. Rogitz (57) ABSTRACT

Methods and apparatus for implementing a home network including a wireless module. In one implementation, a home network includes: two or more host devices, where at least one host device includes a wireless module port, and where the host devices are connected in a local network; and a wireless module connected to the wireless module port of a host device, where the wireless module provides a wireless connection to an external network; where at least one host device is a consumer appliance.

14 Claims, 6 Drawing Sheets

FIG. 6 ns to that it HOME NETWORK USING WIRELESS MODULE

This is a continuation of U.S. patent application Ser. No. 12/609,595, filed Oct. 30, 2009 now U.S. Pat. No. 7,894,414, which is a continuation of U.S. patent application Ser. No. 11/545,388, filed Oct. 10, 2006, now U.S. Pat. No. 7,693,121, which is a continuation of U.S. patent application Ser. No. 09/976,455, now U.S. Pat. No. 7,230,939, filed Oct. 11, 2001, claiming priority from U.S. provisional app. Ser. No. 60/240,011, filed Oct. 13, 2000, from all of which is priority claimed.

This application incorporates herein by reference U.S. patent application Ser. No. 09/972,761, now U.S. Pat. No. 7,020,118, of Akihiko Toyoshima, for SYSTEM AND METHOD FOR ACTIVATION OF A WIRELESS MODULE, filed Oct. 5, 2001; U.S. patent application Ser. No. 09/972,760, now abandoned, of Akhiko Toyoshima, for MULTIPLE WIRELESS FORMAT PHONE SYSTEM AND METHOD, filed Oct. 5, 2001; U.S. patent application Ser. No. 09/974,724, of Akhiko Toyoshima, for WIRELESS MODEM MODULE SERVER SYSTEM, filed Oct. 9, 2001; U.S. patent application Ser. No. 09/972,183, now U.S. Pat. No. 7,460,853, of Akihiko Toyoshima, for WIRELESS MODULE SECURITY SYSTEM AND METHOD, filed Oct. 5, 2001; U.S. patent application Ser. No. 09/977,080, now U.S. Pat. No. 6,907,456 of Akihiko Toyoshima, for A DEFAULT PORTAL SITE ACCESS WITH WIRELESS MODULE, filed Oct. 21, 2001; U.S. patent application Ser. No. 09/972,781, of Akihiko Toyoshima, for SYSTEM, METHOD AND APPARATUS FOR EMBEDDED FIRMWARE CODE UPDATE, filed Oct. 5, 2001; and U.S. patent application Ser. No. 09/928,582, of Baranowski, et al., for WIRELESS MODULE, filed Aug. 13, 2001.

BACKGROUND

The present invention is related to home networks and wireless communication.

A typical home network connects multiple home devices in a local area network (LAN). Examples of home devices include televisions, audio systems, refrigerators, microwave ovens, and other consumer appliances. A home network may also include other network devices, such as a desktop computer. Through the home network, the network devices can communicate with one another, such as to request and provide information. To communicate with devices outside the network one or more of the devices in the home network needs to be connected to an external network.

SUMMARY

The present disclosure provides methods and apparatus for implementing a home network including a wireless module. In one implementation, a home network includes: two or more host devices, where at least one host device includes a wireless module port, and where the host devices are connected in a local network; and a wireless module connected to the wireless module port of a host device, where the wireless module provides a wireless connection to an external network; where at least one host device is a consumer appliance.

In another implementation, a method of registering a home network portal includes: evaluating a status of a wireless module port in a first host device in a home network including multiple host devices; if the wireless module port status indicates a wireless module is not connected, evaluating the status of the wireless module port again; and if the wireless module port status indicates a wireless module is connected, broadcasting to other host devices in the home network that the first host device is a home network portal having a connected wireless module.

In another implementation, a method of sending data from a home network through a home network portal includes: determining which host device in a home network including multiple host devices is a home network portal having a connected wireless module; sending data to the home network portal; sending data from the home network portal through the wireless module to an external network; where at least one host device is a consumer appliance.

In another implementation, a method of receiving data in a home network through a home network portal includes: receiving data from an external network at a home network portal, where the home network portal has a connected wireless module and is a host device in a home network including multiple host devices; determining which host device in the home network is a destination host device for the data; and sending data from the home network portal to the destination host device; where at least one host device is a consumer appliance.

DETAILED DESCRIPTION

The present invention provides methods and apparatus for implementing a home network including a wireless module. One or more host devices in the home network include wireless module ports to connect to respective wireless modules. A wireless module provides a wireless connection to an external network, such as the Internet. A host device connected to a wireless module forms a home network portal and can communicate with the external network across the wireless connection. Other host devices in the home network can also communicate with the external network through a combination of the home network and the home network portal.

Figure 1:
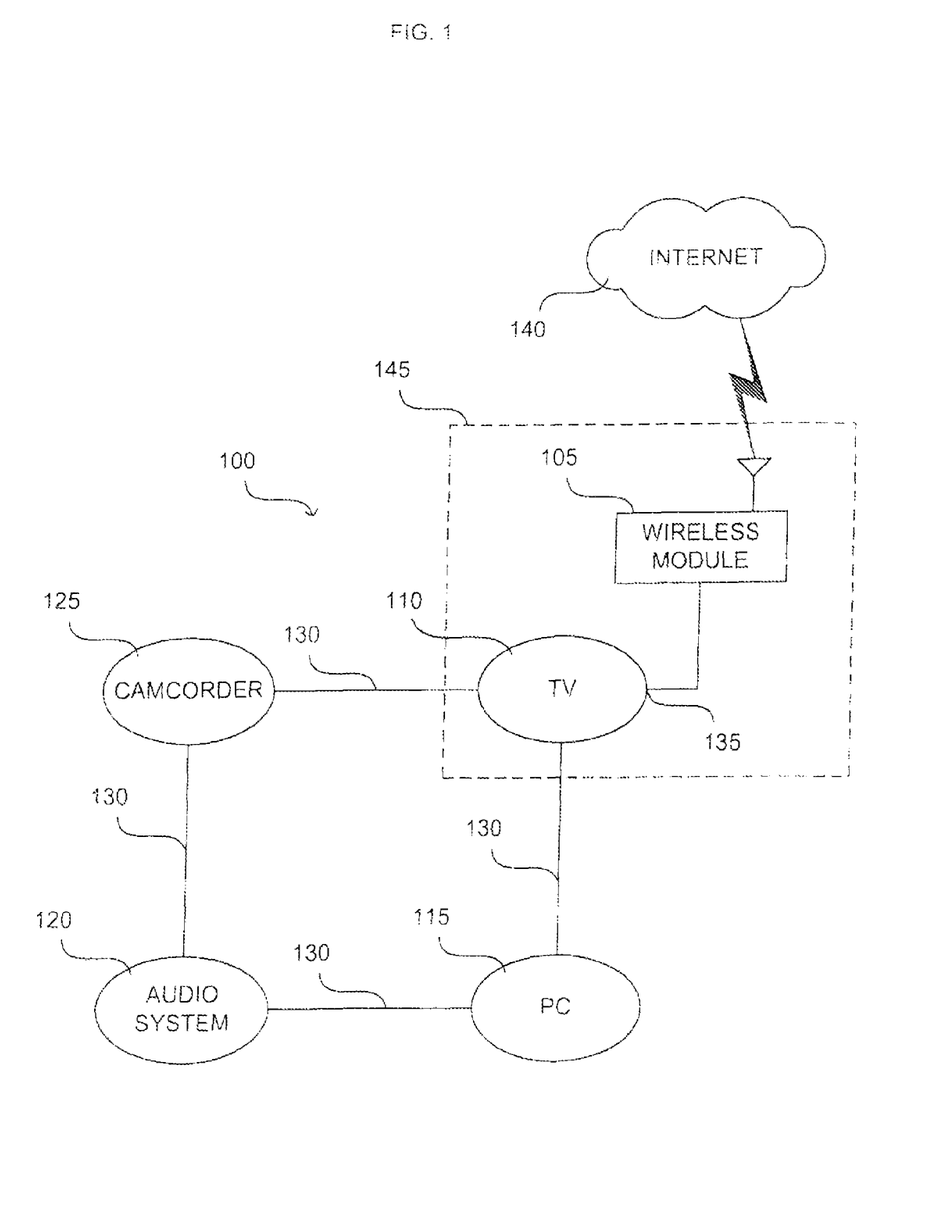
FIG. 1 is a network diagram of a home network including a wireless module according to the present invention.

FIG. 1 is a network diagram of a home network 100 including a wireless module 105. Home network 100 includes four host devices 110, 115, 120, 125. A host device can be a consumer appliance (e.g., a television, an audio system, a refrigerator, or a microwave oven), a computer, or some other network device. In FIG. 1, host device 110 is a television, host device 115 is a desktop computer, host device 120 is an audio system, and host device 125 is a video camcorder. In alternative implementations, home networks include different numbers of host devices, such as two or more. Host devices 110, 115, 120, 125 are interconnected by network links 130 forming a LAN. In FIG. 1, host devices 110, 115, 120, 125 are interconnected in a ring pattern. In alternative implementations, different network configurations can be used, such as a star pattern. Network links 130 can be wireline or wireless.

Accordingly, various network types and configurations can be used in home network 100, such as Ethernet, IEEE 1394, or wireless LAN.

Host device 110 includes a wireless module port 135. Multiple host devices in home network 100 can include respective wireless module ports. Wireless module 105 is connected to host device 110 through wireless module port 135. As described below, in one implementation, wireless module 105 is a removable card and so wireless module port 135 is a matching slot to receive wireless module 105. Host device 110 includes control components to interact with wireless module 105 and communicate with home network 100.

Wireless module 105 can communicate with its connected host device 110 and can communicate through a wireless connection to an external network, such as the Internet 140. In one implementation, wireless module 105 establishes a wireless connection to a base station (not shown) to communicate with the Internet 140.

When host device 110 is connected to wireless module 105, the combination forms a home network portal 145. Host devices 110, 115, 120, 125 can communicate with the Internet 140 through the home network portal 145. Accordingly, home network portal 145 provides a gateway for communication between home network 100 and the Internet 140. In one implementation, multiple wireless modules are connected to respective host devices forming respective home network portals. Each home network portal can provide a connection to a different external network, or some or all of the home network portals can provide connections to the same external network. When wireless module 105 is disconnected from host device 110, home network portal 145 is dissolved. If wireless module 105 is connected to a different host device having a wireless module port, a new home network portal is formed. Accordingly, which host device forms the home network portal is flexible and can be changed by moving the wireless module from one wireless module port to another.

In one example of operation, host device 125 (a video camcorder) sends video data through home network 100 to home network portal 145, including host device 110 (a television) and wireless module 105. Host device 110 sends the video data to wireless module 105. Wireless module 105 sends the video data through a wireless connection to the Internet 140.

Figure 2:
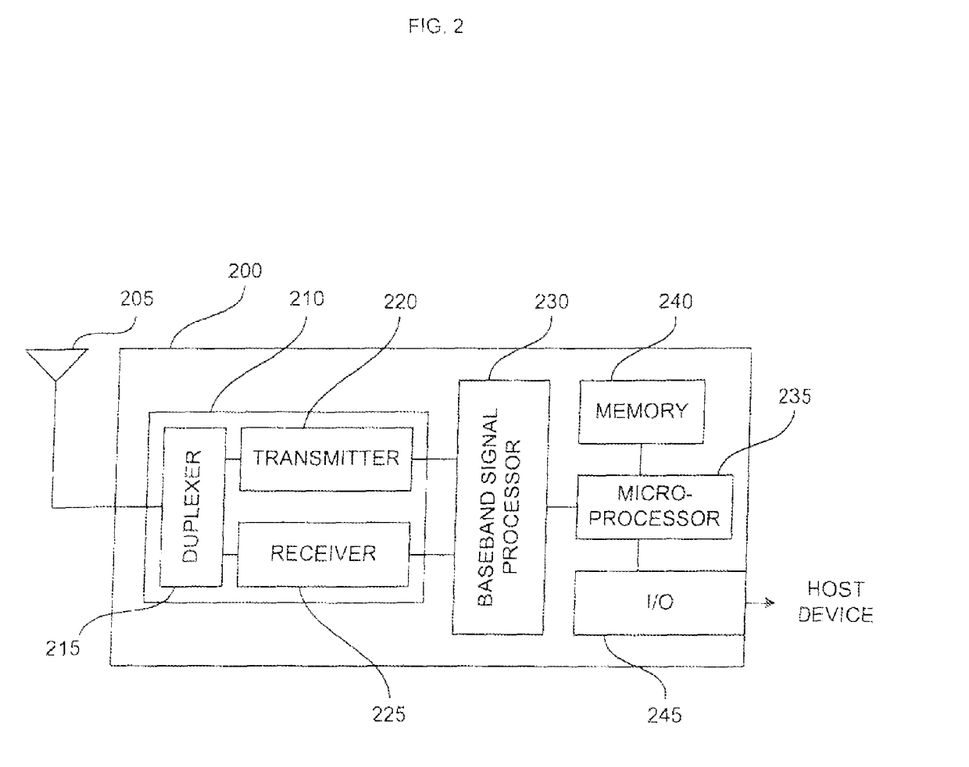
FIG. 2 is a block diagram of one implementation of a wireless module according to the present invention.

FIG. 2 is a block diagram of one implementation of a wireless module 200, corresponding to wireless module 105 in FIG. 1. Wireless module 200 includes an antenna 205. Antenna 205 provides a wireless connection to a network, such as to the Internet 140 as shown in FIG. 1. Antenna 205 is connected to a transceiver circuit 210. Transceiver circuit 210 includes a duplexer 215, a transmitter 220, and a receiver 225. Transmitter 220 and receiver 225 are connected to a baseband signal processor 230. Baseband signal processor 230 processes signals received from and to be sent to transceiver circuit 210. Baseband signal processor 230 is connected to a microprocessor 235. Microprocessor 235 controls the operation of wireless module 200. Microprocessor 235 is connected to a memory 240 and an input/output (I/O) interface 245. Memory 240 provides storage for microprocessor 235. I/O interface 245 provides a connection to a host device, such as through a wireless module port 135 as shown in FIG. 1. I/O interface 245 can be implemented to support various interfaces, such as PCMCIA, Memory Stick™ by Sony Corporation of Japan, USB, IEEE 1394, or a wireless interface, such as a Bluetooth or infrared interface. Accordingly, wireless module 200 can be implemented in various forms, such as a card to be inserted into a wireless module port or an external device to be connected to a wireless module port through a wireline or wireless connection.

In operation, data packets received at antenna 205 are passed through duplexer 215 and receiver 225 to baseband signal processor 230. Baseband signal processor 230 provides the data to microprocessor 235. Microprocessor 235 passes the data to I/O interface 245 and on to a connected host device. Data packets received from a connected host device at I/O interface 245 are passed onto microprocessor 235. Microprocessor 235 provides the data to baseband signal processor 230. In one implementation, microprocessor 235 packetizes the data. Baseband signal processor 230 passes the data to antenna 205 through transmitter 220 and duplexer 215. Antenna 205 sends the data through a wireless connection to an external network, such as the Internet.

Wireless module 205 can be implemented to be compatible with various wireless formats, such as cdmaOne (IS-95B), cdma2000 1x, or cdma2000 1xEV. Wireless module 200 as shown in FIG. 2 is one illustrative implementation of a wireless module, and in alternative implementations alternative architectures can be used, such as one described in Baranowski et al. (application Ser. No. 09/928,582, filed Aug. 13, 2001).

Figure 3:
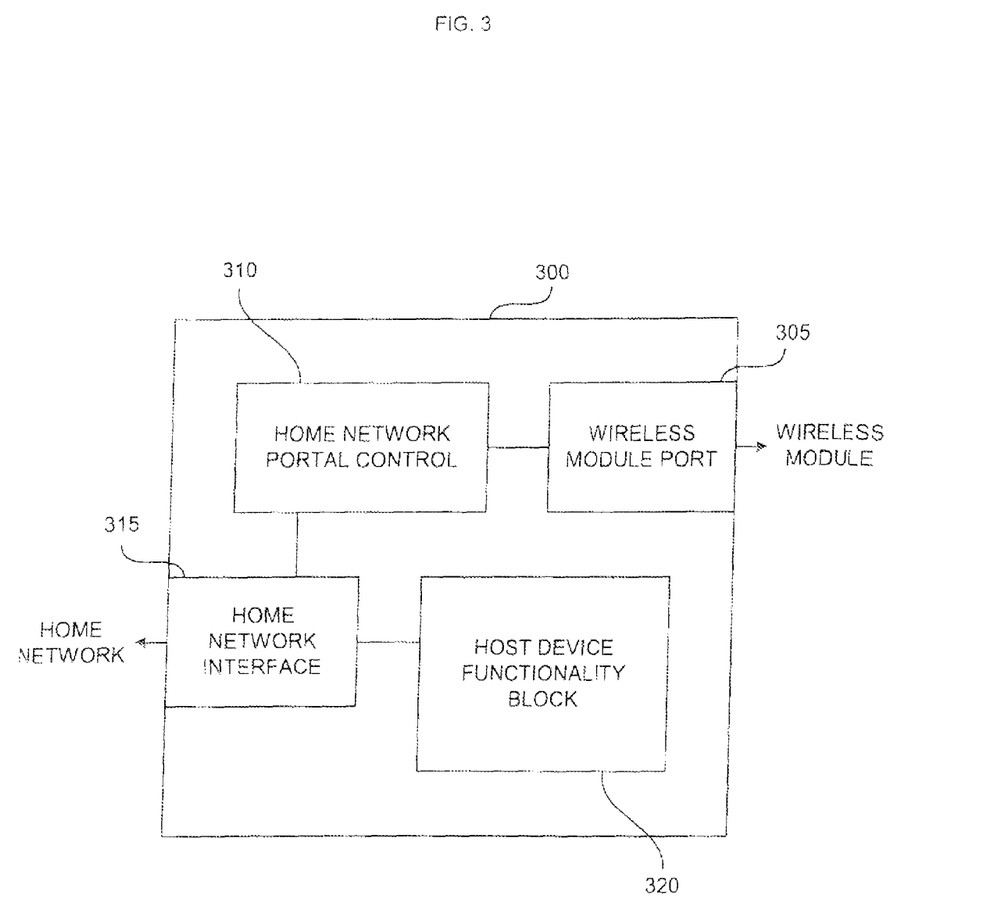
FIG. 3 is a block diagram of a host device including a wireless module port according to the present invention.

FIG. 3 is a block diagram of a host device 300 including a wireless module port 305, corresponding to host device 110 and wireless module port 135 in FIG. 1. Wireless module port 305 provides an interface to a wireless module, such as wireless module 200 in FIG. 2. Wireless module port 305 can be implemented to support various interfaces, such as PCMCIA, Memory Stick™ by Sony Corporation of Japan, USB, IEEE 1394, or a wireless interface, such as a Bluetooth or infrared interface.

Host device 300 includes a home network portal control 310. As described above, a host device 300 that includes a wireless module port 305 becomes a home network portal when a wireless module is connected to the wireless module port 305. Home network portal control 310 passes data to and from a wireless module through wireless module port 305. In one implementation, home network portal control 310 packetizes data to be sent to a wireless module and depacketizes data received from a wireless module.

Home network portal control 310 passes data and a destination from wireless module port 305 to a home network interface 315. Home network interface 315 passes data from host device 300 to the home network and from the home network to host device 300. Host device 300 also includes a host device functionality block 320 connected to home network interface 315. Host device functionality block 320 provides the primary functionality of the host device, such as television functionality, or camcorder functionality.

Home network interface 315 determines the destination for data received from the home network. Home network interface 315 provides data from the home network for the host device functionality block 320 to host device functionality block 320. Home network interface 315 provides data to be sent out of the home network to home network portal control 310.

Home network interface 315 also determines the destination in the home network for data received from host functionality block 320 and received from the wireless module through home network portal control 310. Home network interface 315 passes data into the home network with destination information appropriate to the network protocol used in the home network.

Figure 4:
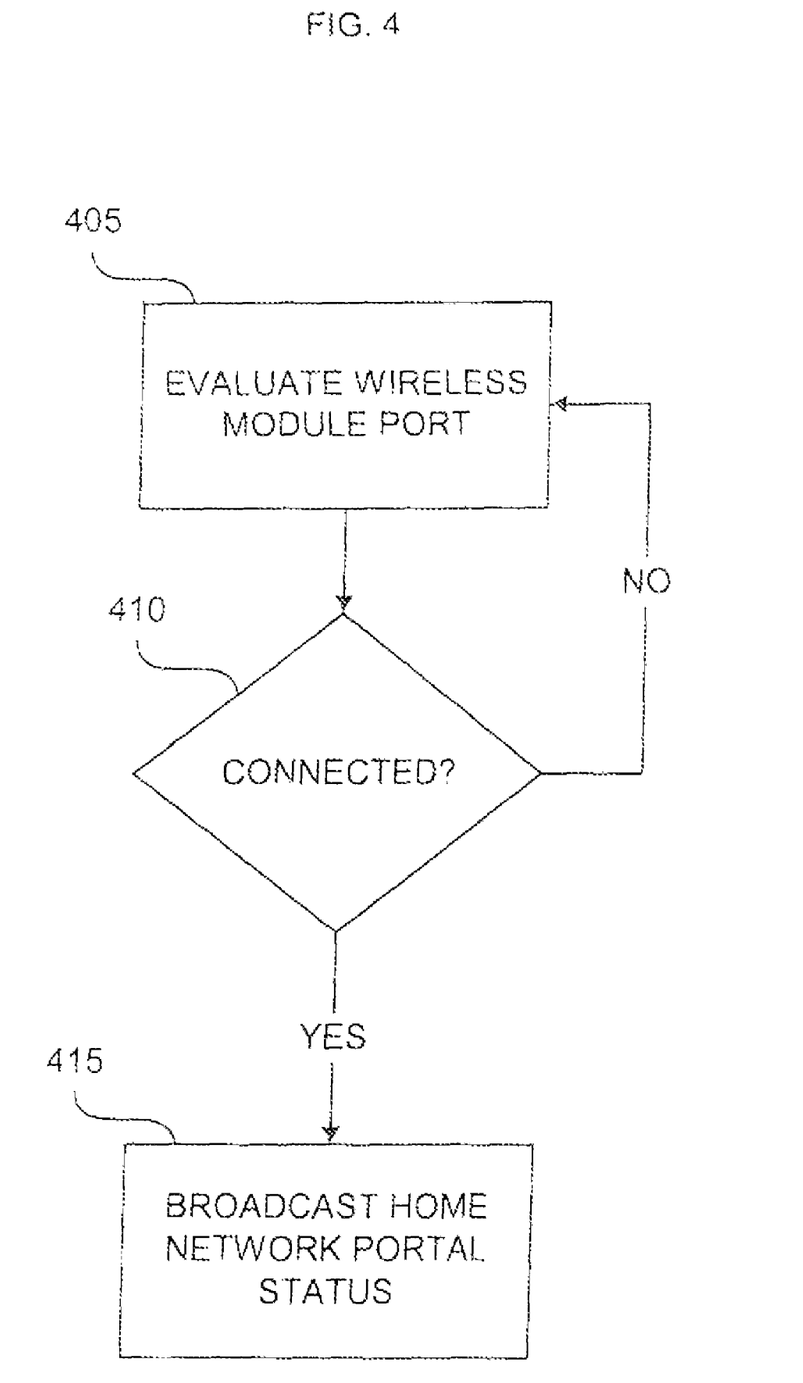
FIG. 4 is a flow chart of registering a home network portal in a home network according to the present invention.

FIG. 4 is a flow chart of registering a home network portal in a home network. In one implementation, each host device having a wireless module port in a home network performs this process on a periodic basis to check for a connected wireless module. The host device evaluates the status of the wireless module port, block 405. Referring to FIG. 3, in one implementation, home network portal control 310 evaluates wireless module port 305. The host device determines whether or not a wireless module is connected to the wireless module port, block 410. If a wireless module is not connected to the wireless module port, the host device returns to block 405. In one implementation, the host device waits for a period of time before returning to block 405. If a wireless module is connected to the wireless module port, the host device broadcasts to the other host devices in the home network that this host device is a home network portal, block 415. Referring to FIG. 3, in one implementation, home network portal 310 provides a broadcast message for the home network to home network interface 315. Home network interface 315 sends the message to each of the host devices in the home network. In one implementation, each host device in the home network records which host device is a home network portal, such as by using a data table in a respective home network interface 315. In another implementation, a host device which is a home network portal also broadcasts to the other host devices in the home network when the wireless module is removed and the home network portal is dissolved. In another implementation, each host device periodically broadcasts to the other host devices in the home network whether or not that host device is a home network portal.

Figure 5:
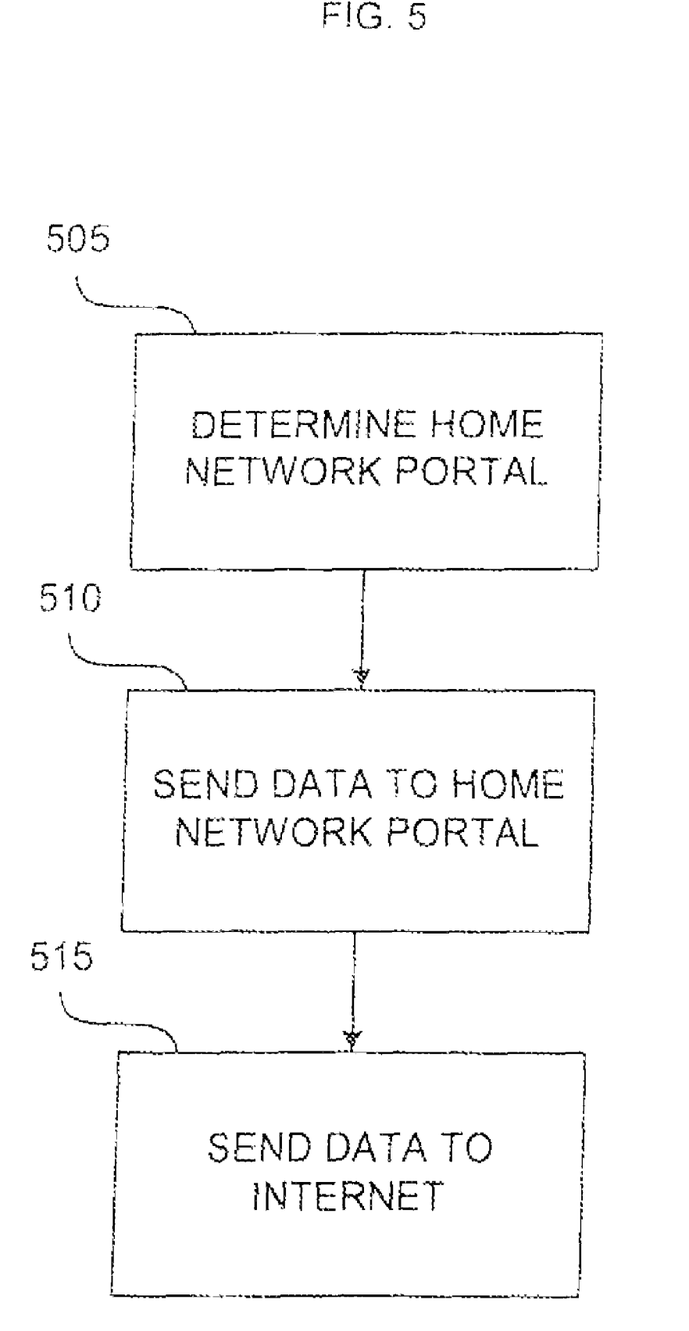
FIG. 5 is a flow chart of sending data out of the home network through the home network portal according to the present invention.

FIG. 5 is a flow chart of sending data out of the home network through the home network portal. A host device that has data to send out of the home network determines which host device is a home network portal, block 505. Referring to FIG. 3, in one implementation, a host device checks a data table in its home network interface 315 to determine which host device is a home network portal. The host device sends the data and a transmission request to the home network portal through the home network, block 510. The transmission request indicates the destination for the data, such as a server on the Internet. The home network portal ends the data through the wireless module across a wireless connection to an external network, such as the Internet, block 515. Referring to FIG. 3, in one implementation, in the home network portal, home network interface 315 receives the data and request and passes the data and request to home network portal control 310. Home network portal control 310 passes the data and destination to a wireless module through wireless module port 305. In one implementation, the wireless module packetizes the outgoing data.

Figure 6:
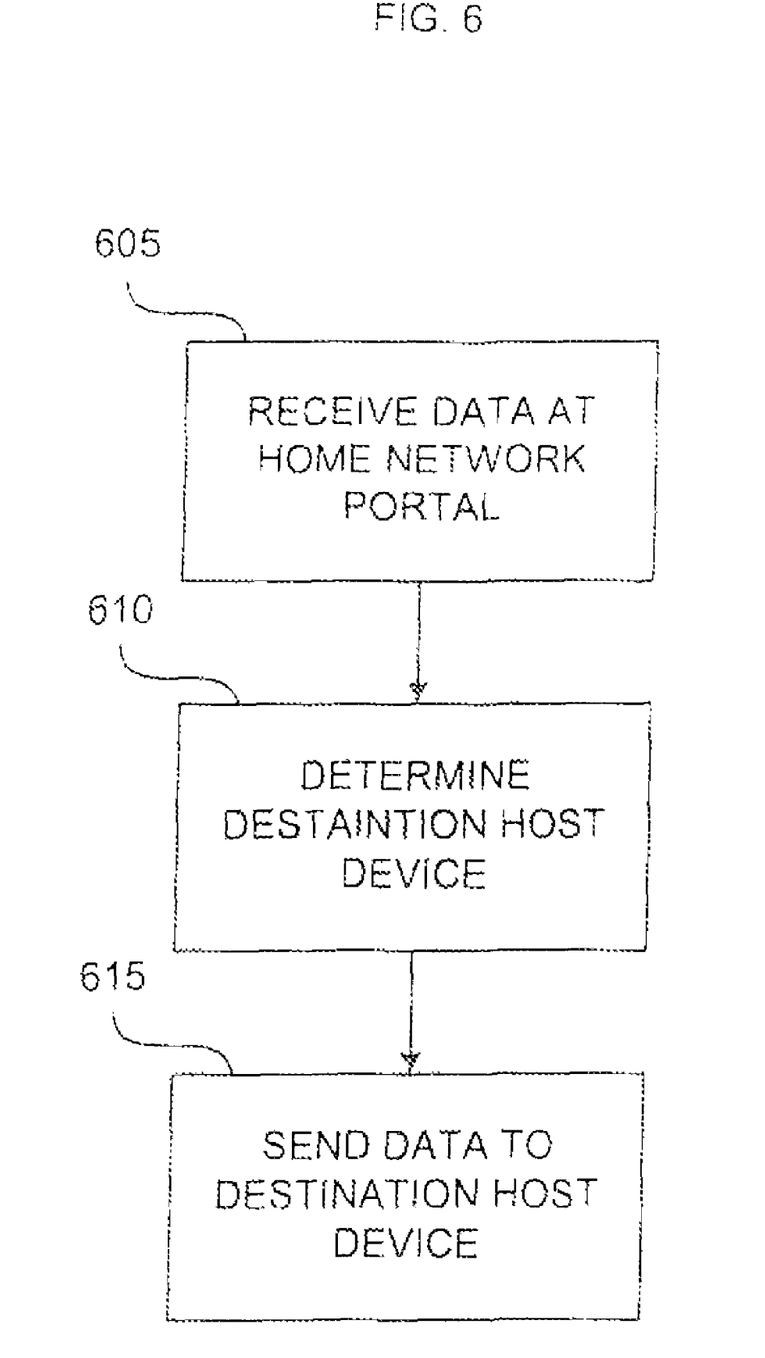
FIG. 6 is a flow chart of receiving data from outside the home network through the home network portal according to the present invention.

FIG. 6 is a flow chart of receiving data from outside the home network through the home network portal. Incoming data, such as from the Internet, is received across a wireless connection at the wireless module in the home network portal, block 605. The host device in the home network portal receives the data from the wireless module and determines which host device in the home network is the intended destination host device for the incoming data, block 610. Referring to FIG. 3, in one implementation, in the home network portal, home network portal control 310 receives the data and destination from the wireless module through wireless module port 305. Home network portal control 310 passes the data and a destination in the home network (which may be the host device in the home network portal) to home network interface 315. The host device in the home network portal sends the data through the home network to the destination host device, block 615. Referring to FIG. 3, in one implementation, home network interface 315 passes the data out to the home network to the destination. If the destination is the host device in the home network portal home network interface 315 passes the data to host functionality block 320.

Various illustrative implementations of the present invention have been described. Aspects of the present invention can be implemented in electronic circuitry, computer hardware, software, or in combinations of them. For example, in FIG. 3, home network portal control 310 and home network interface 315 in a host device can be implemented in various ways, such as with an FPGA, a hardwired design, a microprocessor architecture, or a combination. However, one of ordinary skill in the art will see that additional implementations are also possible and within the scope of the present invention. Accordingly, the present invention is not limited to only those implementations described above.

What is claimed is:

1. Method comprising:
providing at least two components;
establishing communication between the components using a network; and
enabling a user of the network to establish which component defines a portal to the Internet, each component having at least one associated port and each component determining whether a wireless module is connected to the associated port of the component, a component in response to determining that a wireless module is connected to the associated port sending to another component in the network an indication thereof, a component in response to determining that a wireless module has been disconnected from its associated port sending to another component in the network an indication thereof.

2. The method of claim 1, wherein a first one of the components is a TV and a second one of the components is a home appliance.

3. The method of claim 2, comprising connecting first and second wireless modules to the respective TV and home appliance to establish respective first and second network portals simultaneously.

4. The method of claim 3, wherein the first home portal communicates with the Internet and the second home portal communicates with a network other than the Internet.

5. Assembly comprising:
at least two components configured for communication for communication with each other over a home network; wherein
each component has at least one associated port and each component determines whether a wireless module is connected to the associated port of the component, a component in response to determining that a wireless module is connected to the associated port sending to another component in the network an indication thereof, a component in response to determining that a wireless module has been disconnected from its associated port sending to another component in the network an indication thereof.

6. The assembly of claim 5, wherein a first one of the components is a TV and a second one of the components is a home appliance.

7. The assembly of claim 6, comprising first and second wireless modules connected to the respective TV and home appliance to establish respective first and second network portals simultaneously.

8. The assembly of claim 7, wherein the first home portal communicates with the Internet and the second home portal communicates with a network other than the Internet.

9. The assembly of claim 5, wherein a user of the network is enabled to establish which component defines a portal to the Internet.

10. Method comprising:
providing at least two components;
establishing communication between the components using a network;
each component having at least one associated port;
each component determining whether a wireless module is connected to the associated port of the component;
a component in response to determining that a wireless module is connected to the associated port sending to another component in the network an indication thereof; and
a component in response to determining that a wireless module has been disconnected from its associated port sending to another component in the network an indication thereof.

11. The method of claim 10, wherein a'first one of the components is a TV and a second one of the components is a home appliance.

12. The method of claim 11, comprising connecting first and second wireless modules to the respective TV and home appliance to establish respective first and second network portals simultaneously.

13. The method of claim 12, wherein the first home portal communicates with the Internet and the second home portal communicates with a network other than the Internet.

14. The method of claim 10, comprising enabling a user of the network to establish which component defines a portal to the Internet.

* * * * *